(12) United States Patent
Rizvi

(10) Patent No.: US 10,827,073 B2
(45) Date of Patent: Nov. 3, 2020

(54) TECHNIQUES FOR BENCHMARKING PAIRING STRATEGIES IN A CONTACT CENTER SYSTEM

(71) Applicant: Afiniti Europe Technologies Limited, Cheshire (GB)

(72) Inventor: Syed Meesum Raza Rizvi, Islamabad (PK)

(73) Assignee: Afiniti Europe Technologies Limited, Cheshire (GB)

( * ) Notice: Subject to any disclaimer, the term of this patent is extended or adjusted under 35 U.S.C. 154(b) by 0 days.

(21) Appl. No.: 16/573,627

(22) Filed: Sep. 17, 2019

(65) Prior Publication Data

US 2020/0014800 A1 Jan. 9, 2020

Related U.S. Application Data

(63) Continuation of application No. 16/114,511, filed on Aug. 28, 2018, now Pat. No. 10,419,615, which is a
(Continued)

(51) Int. Cl.
*H04M 3/523* (2006.01)
*G06Q 10/06* (2012.01)
(Continued)

(52) U.S. Cl.
CPC .......... *H04M 3/5232* (2013.01); *G06F 17/18* (2013.01); *G06Q 10/0639* (2013.01);
(Continued)

(58) Field of Classification Search
CPC ............. H04M 3/5232; H04M 3/5233; H04M 3/5141; H04M 2203/551;
(Continued)

(56) References Cited

U.S. PATENT DOCUMENTS 5,155,763 A 10/1992 Bigus et al.
5,206,903 A 4/1993 Kohler et al.
(Continued)

FOREIGN PATENT DOCUMENTS

AU 2008349500 C1 5/2014
AU 2009209317 B2 5/2014
(Continued)

OTHER PUBLICATIONS

Anonymous. (2006) "Performance Based Routing in Profit Call Centers," The Decision Makers' Direct, located at www.decisioncraft.com, Issue Jun. 2002 (3 pages).
(Continued)

*Primary Examiner* — Quynh H Nguyen
(74) *Attorney, Agent, or Firm* — Wilmer Cutler Pickering Hale and Dorr LLP

(57) ABSTRACT

Techniques for benchmarking pairing strategies in a contact center system are disclosed. In one particular embodiment, the techniques may be realized as a method for benchmarking pairing strategies in a contact center system including determining results for a first plurality of contact-agent interactions, determining results for a second plurality of contact-agent interactions, and determining combined results across the first and second pluralities of contact-agent interactions corrected for a Yule-Simpson effect.

20 Claims, 3 Drawing Sheets

Related U.S. Application Data continuation of application No. 15/633,162, filed on Jun. 26, 2017, now Pat. No. 10,110,745, which is a continuation of application No. 15/251,591, filed on Aug. 30, 2016, now Pat. No. 9,692,899.

(51) Int. Cl.
*G06F 17/18* (2006.01)
*H04M 3/51* (2006.01)

(52) U.S. Cl.
CPC .... *G06Q 10/06398* (2013.01); *H04M 3/5233* (2013.01); *H04M 3/5141* (2013.01); *H04M 2203/551* (2013.01); *H04M 2203/556* (2013.01)

(58) Field of Classification Search
CPC ............. H04M 2203/556; G06F 17/18; G06Q 10/0639; G06Q 10/06398
USPC .................. 379/265.02, 265.01, 266.01, 309
See application file for complete search history.

(56) References Cited

U.S. PATENT DOCUMENTS

| | | |
|---|---|---|
| 5,327,490 A | 7/1994 | Cave |
| 5,537,470 A | 7/1996 | Lee |
| 5,702,253 A | 12/1997 | Bryce et al. |
| 5,825,869 A | 10/1998 | Brooks et al. |
| 5,903,641 A | 5/1999 | Tonisson |
| 5,907,601 A | 5/1999 | David et al. |
| 5,926,538 A | 7/1999 | Deryugin et al. |
| 6,044,355 A | 3/2000 | Crockett et al. |
| 6,049,603 A | 4/2000 | Schwartz et al. |
| 6,052,460 A | 4/2000 | Fisher et al. |
| 6,064,731 A | 5/2000 | Flockhart et al. |
| 6,088,444 A | 7/2000 | Walker et al. |
| 6,163,607 A | 12/2000 | Bogart et al. |
| 6,222,919 B1 | 4/2001 | Hollatz et al. |
| 6,292,555 B1 | 9/2001 | Okamoto |
| 6,324,282 B1 | 11/2001 | McIllwaine et al. |
| 6,333,979 B1 | 12/2001 | Bondi et al. |
| 6,389,132 B1 | 5/2002 | Price |
| 6,389,400 B1 | 5/2002 | Bushey et al. |
| 6,408,066 B1 | 6/2002 | Andruska et al. |
| 6,411,687 B1 | 6/2002 | Bohacek et al. |
| 6,424,709 B1 | 7/2002 | Doyle et al. |
| 6,434,230 B1 | 8/2002 | Gabriel |
| 6,496,580 B1 | 12/2002 | Chack |
| 6,504,920 B1 | 1/2003 | Okon et al. |
| 6,519,335 B1 | 2/2003 | Bushnell |
| 6,535,601 B1 | 3/2003 | Flockhart et al. |
| 6,570,980 B1 | 5/2003 | Baruch |
| 6,587,556 B1 | 7/2003 | Judkins et al. |
| 6,603,854 B1 | 8/2003 | Judkins et al. |
| 6,639,976 B1 | 10/2003 | Shellum et al. |
| 6,661,889 B1 | 12/2003 | Flockhart et al. |
| 6,704,410 B1 | 3/2004 | McFarlane et al. |
| 6,707,904 B1 | 3/2004 | Judkins et al. |
| 6,714,643 B1 | 3/2004 | Gargeya et al. |
| 6,763,104 B1 | 7/2004 | Judkins et al. |
| 6,774,932 B1 | 8/2004 | Ewing et al. |
| 6,775,378 B1 | 8/2004 | Villena et al. |
| 6,798,876 B1 | 9/2004 | Bala |
| 6,829,348 B1 | 12/2004 | Schroeder et al. |
| 6,832,203 B1 | 12/2004 | Villena et al. |
| 6,859,529 B2 | 2/2005 | Duncan et al. |
| 6,895,083 B1 | 5/2005 | Bers et al. |
| 6,922,466 B1 | 7/2005 | Peterson et al. |
| 6,937,715 B2 | 8/2005 | Delaney |
| 6,956,941 B1 | 10/2005 | Duncan et al. |
| 6,970,821 B1 | 11/2005 | Shambaugh et al. |
| 6,978,006 B1 | 12/2005 | Polcyn |
| 7,023,979 B1 | 4/2006 | Wu et al. |
| 7,039,166 B1 | 5/2006 | Peterson et al. |
| 7,050,566 B2 | 5/2006 | Becerra et al. |
| 7,050,567 B1 | 5/2006 | Jensen |
| 7,062,031 B2 | 6/2006 | Becerra et al. |
| 7,068,775 B1 | 6/2006 | Lee |
| 7,092,509 B1 | 8/2006 | Mears et al. |
| 7,103,172 B2 | 9/2006 | Brown et al. |
| 7,158,628 B2 | 1/2007 | McConnell et al. |
| 7,184,540 B2 | 2/2007 | Dezonno et al. |
| 7,209,549 B2 | 4/2007 | Reynolds et al. |
| 7,231,032 B2 | 6/2007 | Nevman et al. |
| 7,231,034 B1 | 6/2007 | Rikhy et al. |
| 7,236,584 B2 | 6/2007 | Torba |
| 7,245,716 B2 | 7/2007 | Brown et al. |
| 7,245,719 B2 | 7/2007 | Kawada et al. |
| 7,266,251 B2 | 9/2007 | Rowe |
| 7,269,253 B1 | 9/2007 | Wu et al. |
| 7,353,388 B1 | 4/2008 | Gilman et al. |
| 7,398,224 B2 | 7/2008 | Cooper |
| 7,593,521 B2 | 9/2009 | Becerra et al. |
| 7,676,034 B1 | 3/2010 | Wu et al. |
| 7,725,339 B1 | 5/2010 | Aykin |
| 7,734,032 B1 | 6/2010 | Kiefhaber et al. |
| 7,826,597 B2 | 11/2010 | Berner et al. |
| 7,864,944 B2 | 1/2011 | Khouri et al. |
| 7,899,177 B1 | 3/2011 | Bruening et al. |
| 7,916,858 B1 | 3/2011 | Heller et al. |
| 7,940,917 B2 | 5/2011 | Lauridsen et al. |
| 7,961,866 B1 | 6/2011 | Boutcher et al. |
| 7,995,717 B2 | 8/2011 | Conway et al. |
| 8,000,989 B1 | 8/2011 | Kiefhaber et al. |
| 8,010,607 B2 | 8/2011 | McCormack et al. |
| 8,094,790 B2 | 1/2012 | Conway et al. |
| 8,126,133 B1 | 2/2012 | Everingham et al. |
| 8,140,441 B2 | 3/2012 | Cases et al. |
| 8,175,253 B2 | 5/2012 | Knott et al. |
| 8,229,102 B2 | 7/2012 | Knott et al. |
| 8,249,245 B2 | 8/2012 | Jay et al. |
| 8,295,471 B2 | 10/2012 | Spottiswoode et al. |
| 8,300,798 B1 | 10/2012 | Wu et al. |
| 8,306,212 B2 | 11/2012 | Arora |
| 8,359,219 B2 | 1/2013 | Chishti et al. |
| 8,433,597 B2 | 4/2013 | Chishti et al. |
| 8,472,611 B2 | 6/2013 | Chishti |
| 8,565,410 B2 | 10/2013 | Chishti et al. |
| 8,634,542 B2 | 1/2014 | Spottiswoode et al. |
| 8,644,490 B2 | 2/2014 | Stewart |
| 8,670,548 B2 | 3/2014 | Xie et al. |
| 8,699,694 B2 | 4/2014 | Chishti et al. |
| 8,712,821 B2 | 4/2014 | Spottiswoode |
| 8,718,271 B2 | 5/2014 | Spottiswoode |
| 8,724,797 B2 | 5/2014 | Chishti et al. |
| 8,731,178 B2 | 5/2014 | Chishti et al. |
| 8,737,595 B2 | 5/2014 | Chishti et al. |
| 8,750,488 B2 | 6/2014 | Spottiswoode et al. |
| 8,781,100 B2 | 7/2014 | Spottiswoode et al. |
| 8,781,106 B2 | 7/2014 | Afzal |
| 8,792,630 B2 | 7/2014 | Chishti et al. |
| 8,824,658 B2 | 9/2014 | Chishti |
| 8,879,715 B2 | 11/2014 | Spottiswoode et al. |
| 8,903,079 B2 | 12/2014 | Xie et al. |
| 8,929,537 B2 | 1/2015 | Chishti et al. |
| 8,995,647 B2 | 3/2015 | Li et al. |
| 9,020,137 B2 | 4/2015 | Chishti et al. |
| 9,025,757 B2 | 5/2015 | Spottiswoode et al. |
| 9,277,055 B2 | 3/2016 | Spottiswoode et al. |
| 9,300,802 B1 | 3/2016 | Chishti |
| 9,426,296 B2 | 8/2016 | Chishti et al. |
| 10,135,987 B1 | 11/2018 | Chishti et al. |
| 2001/0032120 A1 | 10/2001 | Stuart et al. |
| 2002/0018554 A1 | 2/2002 | Jensen et al. |
| 2002/0046030 A1 | 4/2002 | Haritsa et al. |
| 2002/0059164 A1 | 5/2002 | Shtivelman |
| 2002/0082736 A1 | 6/2002 | Lech et al. |
| 2002/0110234 A1 | 8/2002 | Walker et al. |
| 2002/0111172 A1 | 8/2002 | DeWolf et al. |
| 2002/0131399 A1 | 9/2002 | Philonenko |
| 2002/0138285 A1 | 9/2002 | DeCotiis et al. |
| 2002/0143599 A1 | 10/2002 | Nourbakhsh et al. |
| 2002/0161765 A1 | 10/2002 | Kundrot et al. |

(56) References Cited

U.S. PATENT DOCUMENTS

| | | |
|---|---|---|
| 2002/0184069 A1 | 12/2002 | Kosiba et al. |
| 2002/0196845 A1 | 12/2002 | Richards et al. |
| 2003/0002653 A1 | 1/2003 | Uckun |
| 2003/0059029 A1 | 3/2003 | Mengshoel et al. |
| 2003/0081757 A1 | 5/2003 | Mengshoel et al. |
| 2003/0095652 A1 | 5/2003 | Mengshoel et al. |
| 2003/0169870 A1 | 9/2003 | Stanford |
| 2003/0174830 A1 | 9/2003 | Boyer et al. |
| 2003/0217016 A1 | 11/2003 | Pericle |
| 2004/0028211 A1 | 2/2004 | Culp et al. |
| 2004/0057416 A1 | 3/2004 | McCormack |
| 2004/0096050 A1 | 5/2004 | Das et al. |
| 2004/0098274 A1 | 5/2004 | Dezonno et al. |
| 2004/0101127 A1 | 5/2004 | Dezonno et al. |
| 2004/0109555 A1 | 6/2004 | Williams |
| 2004/0133434 A1 | 7/2004 | Szlam et al. |
| 2004/0210475 A1 | 10/2004 | Starnes et al. |
| 2004/0230438 A1 | 11/2004 | Pasquale et al. |
| 2004/0267816 A1 | 12/2004 | Russek |
| 2005/0013428 A1 | 1/2005 | Walters |
| 2005/0043986 A1 | 2/2005 | McConnell et al. |
| 2005/0047581 A1 | 3/2005 | Shaffer et al. |
| 2005/0047582 A1 | 3/2005 | Shaffer et al. |
| 2005/0071223 A1 | 3/2005 | Jain et al. |
| 2005/0129212 A1 | 6/2005 | Parker |
| 2005/0135593 A1 | 6/2005 | Becerra et al. |
| 2005/0135596 A1 | 6/2005 | Zhao |
| 2005/0187802 A1 | 8/2005 | Koeppel |
| 2005/0195960 A1 | 9/2005 | Shaffer et al. |
| 2005/0286709 A1 | 12/2005 | Horton et al. |
| 2006/0098803 A1 | 5/2006 | Bushey et al. |
| 2006/0110052 A1 | 5/2006 | Finlayson |
| 2006/0124113 A1 | 6/2006 | Roberts |
| 2006/0184040 A1 | 8/2006 | Keller et al. |
| 2006/0222164 A1 | 10/2006 | Contractor et al. |
| 2006/0233346 A1 | 10/2006 | McIlwaine et al. |
| 2006/0262918 A1 | 11/2006 | Karnalkar et al. |
| 2006/0262922 A1 | 11/2006 | Margulies et al. |
| 2007/0036323 A1 | 2/2007 | Travis |
| 2007/0071222 A1 | 3/2007 | Flockhart et al. |
| 2007/0121602 A1 | 5/2007 | Sin et al. |
| 2007/0121829 A1 | 5/2007 | Tal et al. |
| 2007/0136342 A1 | 6/2007 | Singhai et al. |
| 2007/0154007 A1 | 7/2007 | Bernhard |
| 2007/0174111 A1 | 7/2007 | Anderson et al. |
| 2007/0198322 A1 | 8/2007 | Bourne et al. |
| 2007/0211881 A1 | 9/2007 | Parker-Stephen |
| 2007/0219816 A1 | 9/2007 | Van Luchene et al. |
| 2007/0274502 A1 | 11/2007 | Brown |
| 2008/0002823 A1 | 1/2008 | Fama et al. |
| 2008/0008309 A1 | 1/2008 | Dezonno et al. |
| 2008/0046386 A1 | 2/2008 | Pieraccinii et al. |
| 2008/0065476 A1 | 3/2008 | Klein et al. |
| 2008/0118052 A1 | 5/2008 | Houmaidi et al. |
| 2008/0152122 A1 | 6/2008 | Idan et al. |
| 2008/0181389 A1 | 7/2008 | Bourne et al. |
| 2008/0199000 A1 | 8/2008 | Su et al. |
| 2008/0267386 A1 | 10/2008 | Cooper |
| 2008/0273687 A1 | 11/2008 | Knott et al. |
| 2009/0043670 A1 | 2/2009 | Johansson et al. |
| 2009/0086933 A1 | 4/2009 | Patel et al. |
| 2009/0190740 A1 | 7/2009 | Chishti et al. |
| 2009/0190743 A1 | 7/2009 | Spottiswoode |
| 2009/0190744 A1 | 7/2009 | Xie et al. |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie et al. |
| 2009/0232294 A1 | 9/2009 | Xie et al. |
| 2009/0234710 A1 | 9/2009 | Belgaied Hassine et al. |
| 2009/0245493 A1 | 10/2009 | Chen et al. |
| 2009/0304172 A1 | 12/2009 | Becerra et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054431 A1 | 3/2010 | Jaiswal et al. |
| 2010/0054452 A1 | 3/2010 | Afzal |
| 2010/0054453 A1 | 3/2010 | Stewart |
| 2010/0086120 A1 | 4/2010 | Brussat et al. |
| 2010/0111285 A1 | 5/2010 | Chishti |
| 2010/0111286 A1 | 5/2010 | Chishti |
| 2010/0111287 A1 | 5/2010 | Xie et al. |
| 2010/0111288 A1 | 5/2010 | Afzal et al. |
| 2010/0142689 A1 | 6/2010 | Hansen et al. |
| 2010/0142698 A1 | 6/2010 | Spottiswoode et al. |
| 2010/0183138 A1 | 7/2010 | Spottiswoode et al. |
| 2011/0022357 A1 | 1/2011 | Vock et al. |
| 2011/0031112 A1 | 2/2011 | Birang et al. |
| 2011/0069821 A1 | 3/2011 | Korolev et al. |
| 2011/0125048 A1 | 5/2011 | Causevic et al. |
| 2012/0051536 A1 | 3/2012 | Chishti et al. |
| 2012/0051537 A1 | 3/2012 | Chishti et al. |
| 2012/0183131 A1 | 7/2012 | Kohler et al. |
| 2012/0224680 A1 | 9/2012 | Spottiswoode et al. |
| 2012/0278136 A1 | 11/2012 | Flockhart et al. |
| 2013/0003959 A1 | 1/2013 | Nishikawa et al. |
| 2013/0051545 A1 | 2/2013 | Ross et al. |
| 2013/0251137 A1 | 9/2013 | Chishti et al. |
| 2014/0044246 A1 | 2/2014 | Klemm et al. |
| 2014/0079210 A1 | 3/2014 | Kohler et al. |
| 2014/0119531 A1 | 5/2014 | Tuchman et al. |
| 2014/0341370 A1 | 11/2014 | Li et al. |
| 2015/0055772 A1 | 2/2015 | Klemm et al. |
| 2016/0080573 A1 | 3/2016 | Chishti |
| 2017/0208176 A1 | 7/2017 | Chishti |

FOREIGN PATENT DOCUMENTS

| | | |
|---|---|---|
| AU | 2009311534 B2 | 8/2014 |
| CN | 102301688 B | 5/2014 |
| CN | 102017591 B | 11/2014 |
| EP | 0493292 A2 | 7/1992 |
| EP | 0949793 A1 | 10/1999 |
| EP | 1032188 A1 | 8/2000 |
| EP | 1335572 A2 | 8/2003 |
| JP | 11-098252 A | 4/1999 |
| JP | 2000-078291 A | 3/2000 |
| JP | 2000-078292 A | 3/2000 |
| JP | 2000-092213 A | 3/2000 |
| JP | 2000-236393 A | 8/2000 |
| JP | 2001-292236 A | 10/2001 |
| JP | 2001-518753 A | 10/2001 |
| JP | 2002-297900 A | 10/2002 |
| JP | 3366565 B2 | 1/2003 |
| JP | 2003-187061 A | 7/2003 |
| JP | 2004-056517 A | 2/2004 |
| JP | 2004-227228 A | 8/2004 |
| JP | 2006-345132 A | 12/2006 |
| JP | 2007-324708 A | 12/2007 |
| JP | 2011-511533 A | 4/2011 |
| JP | 2011-511536 A | 4/2011 |
| JP | 2012-075146 A | 4/2012 |
| JP | 5421928 B2 | 2/2014 |
| JP | 5631326 B2 | 11/2014 |
| JP | 5649575 B2 | 1/2015 |
| MX | 316118 | 12/2013 |
| MX | 322251 | 7/2014 |
| NZ | 587100 B | 10/2013 |
| NZ | 587101 B | 10/2013 |
| NZ | 591486 B | 1/2014 |
| NZ | 592781 B | 3/2014 |
| PH | 1-2010-501704 | 2/2014 |
| PH | 1-2010-501705 | 2/2015 |
| WO | WO-99/17517 A1 | 4/1999 |
| WO | WO-2001/063894 A2 | 8/2001 |
| WO | WO-2006/124113 A2 | 11/2006 |
| WO | WO-2010/053701 A2 | 5/2010 |

(56) References Cited

FOREIGN PATENT DOCUMENTS

WO    WO-2011/081514 A1    7/2011
WO    WO-2013/148453 A1    10/2013

OTHER PUBLICATIONS

Bickel, P. J., et al., "Sex Bias in Graduate Admissions: Data from Berkeley," Science, vol. 187, No. 4175, pp. 398-404 (Feb. 7, 1975).

Cleveland, William S., "Robust Locally Weighted Regression and Smoothing Scatterplots," Journal of the American Statistical Association, vol. 74, No. 368, Dec. 1979, pp. 829-836 (8 pages).

Gans, N. et al. (2003), "Telephone Call Centers: Tutorial, Review and Research Prospects," Manufacturing & Service Operations Management, vol. 5, No. 2, pp. 79-141.

Koole, G. (2004). "Performance Analysis and Optimization in Customer Contact Centers," Proceedings of the Quantitative Evaluation of Systems, First International Conference, Sep. 27-30, 2004 (4 pages).

Koole, G. et al. (Mar. 6, 2006). "An Overview of Routing and Staffing Algorithms in Multi-Skill Customer Contact Centers," Manuscript, 42 pages.

Ntzoufras, "Bayesian Modeling Using Winbugs". Wiley Interscience, Chapter 5, Normal Regression Models, Oct. 18, 2007, Redacted version, pp. 155-220 (67 pages).

Press, W. H. and Rybicki, G. B., "Fast Algorithm for Spectral Analysis of Unevenly Sampled Data," The Astrophysical Journal, vol. 338, Mar. 1, 1989, pp. 277-280 (4 pages).

Riedmiller, M. et al. (1993). "A Direct Adaptive Method for Faster Back Propagation Learning: The RPROP Algorithm," 1993 IEEE International Conference on Neural Networks, San Francisco, CA, Mar. 28-Apr. 1, 1993, 1:586-591.

Stanley et al., "Improving call center operations using performance-based routing strategies," Calif. Journal of Operations Management, 6(1), 24-32, Feb. 2008; retrieved from http://userwww.sfsu.edu/saltzman/Publist.html.

TECHNIQUES FOR BENCHMARKING PAIRING STRATEGIES IN A CONTACT CENTER SYSTEM

CROSS-REFERENCE TO RELATED APPLICATIONS

This application is a continuation of U.S. patent application Ser. No. 16/114,511, filed Aug. 28, 2018, now U.S. Pat. No. 10,419,615, which is a continuation of U.S. patent application Ser. No. 15/633,162, filed Jun. 26, 2017, now U.S. Pat. No. 10,110,745, which is a continuation of U.S. patent application Ser. No. 15/251,591, filed Aug. 30, 2016, now U.S. Pat. No. 9,692,899, which are hereby incorporated by reference in their entirety as if fully set forth herein.

FIELD OF THE DISCLOSURE

This disclosure generally relates to contact centers and, more particularly, to techniques for benchmarking pairing strategies in a contact center system.

BACKGROUND OF THE DISCLOSURE

A typical contact center algorithmically assigns contacts arriving at the contact center to agents available to handle those contacts. Several potential algorithms exist for assigning contacts to contact center agents. These include time-ordered assignment strategies, utilization-based assignment strategies, performance-based assignment strategies, and behaviorally-based assignment strategies.

At times, contact center administrators may wish to compare the performance of one algorithm against another. In some cases, contact center administrators can do this by alternating between the two algorithms and examining the resultant differences in performance over time. Such a benchmarking process can be subject to the Yule-Simpson effect (also referred to as "Simpson's Paradox") in which the aggregation or amalgamation of distinct cross-sections of data can result in a misleading assessment of the actual performance differential between the assignment algorithms being alternated.

In some cases, such a mischaracterization of performance can be large. For example, one algorithm may consistently outperform another in each of the periods in which it was responsible for contact assignment, but when aggregated the apparent performance of the two algorithms may in fact be reversed.

In view of the foregoing, it may be understood that there is a need for a system that corrects for such a mischaracterization that can result from the Yule-Simpson effect.

SUMMARY OF THE DISCLOSURE

Techniques for benchmarking pairing strategies in a contact center system are disclosed. In one embodiment, the techniques may be realized as a method for benchmarking pairing strategies in a contact center system comprising determining, by at least one computer processor configured to operate in the contact center system, results for a first plurality of contact-agent interactions; determining, by the at least one computer processor, results for a second plurality of contact-agent interactions; and determining, by the at least one computer processor, combined results across the first and second pluralities of contact-agent interactions corrected for a Yule-Simpson effect.

In accordance with other aspects of this embodiment, at least one of the first and second pluralities of contact-agent interactions may be paired using at least two pairing strategies.

In accordance with other aspects of this embodiment, a pairing strategy of the at least two pairing strategies may comprise at least one of: a behavioral pairing (BP) strategy, a first-in, first-out (FIFO) pairing strategy, a performance-based routing (PBR) strategy, a highest-performing-agent pairing strategy, a highest-performing-agent-for-contact-type pairing strategy, a longest-available-agent pairing strategy, a least-occupied-agent pairing strategy, a randomly-selected-agent pairing strategy, a randomly-selected-contact pairing strategy, a fewest-contacts-taken-by-agent pairing strategy, a sequentially-labeled-agent pairing strategy, a longest-waiting-contact pairing strategy, and a highest-priority-contact pairing strategy.

In accordance with other aspects of this embodiment, the at least two pairing strategies may alternate more frequently than once per day.

In accordance with other aspects of this embodiment, the at least two pairing strategies may alternate more frequently more frequently than once per hour.

In accordance with other aspects of this embodiment, the Yule-Simpson effect may be a result of an underlying partitioning of contact-agent interactions into at least the first and second pluralities of contact-agent interactions according to at least one of: a plurality of time periods, a plurality of agent skills, a plurality of contact-agent assignment strategies (pairing strategies), a plurality of contact center sites, a plurality of contact center switches, and a plurality of benchmarking schedules.

In accordance with other aspects of this embodiment, the method may further comprise determining, by the at least one computer processor, an estimation of an extent of the Yule-Simpson effect.

In another embodiment, the techniques may be realized as a system for benchmarking pairing strategies in a contact center system comprising: at least one computer processor configured to operate in the contact center system, wherein the at least one computer processor is further configured to: determine results for a first plurality of contact-agent interactions; determine results for a second plurality of contact-agent interactions; and determine combined results across the first and second pluralities of contact-agent interactions corrected for a Yule-Simpson effect.

In another embodiment, the techniques may be realized as an article of manufacture for benchmarking pairing strategies in a contact center system comprising: a non-transitory computer processor readable medium; and instructions stored on the medium; wherein the instructions are configured to be readable from the medium by at least one computer processor configured to operate in the contact center system and thereby cause the at least one computer processor to operate further so as to: determine results for a first plurality of contact-agent interactions; determine results for a second plurality of contact-agent interactions; and determine combined results across the first and second pluralities of contact-agent interactions corrected for a Yule-Simpson effect.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

A typical contact center algorithmically assigns contacts arriving at the contact center to agents available to handle those contacts. Several potential algorithms exist for assigning contacts to contact center agents. These include time-ordered assignment strategies, utilization-based assignment strategies, performance-based assignment strategies, and behaviorally-based assignment strategies.

At times, contact center administrators may wish to compare the performance of one algorithm against another. In some cases, contact center administrators can do this by alternating between the two algorithms and examining the resultant differences in performance over time. Such a benchmarking process can be subject to the Yule-Simpson effect (also referred to as "Simpson's Paradox") in which the aggregation or amalgamation of distinct cross-sections of data can result in a misleading assessment of the actual performance differential between the assignment algorithms being alternated. See E. Simpson, "The Interpretation of Interaction in Contingency Tables," *J. of the Royal Statistical Society*, Series B, vol. 13, at pp. 238-241 (1951), which is hereby incorporated by reference.

In some cases, such a mischaracterization of performance can be large. For example, one algorithm may consistently outperform another in each of the periods in which it was responsible for contact assignment, but when aggregated the apparent performance of the two algorithms may in fact be reversed. A classic example of a reversal due to the Yule-Simpson effect was found in a study of graduate school admissions, in which most individual departments had a bias in favor of admitting female students, but aggregating the data made it appear as if the school as a whole had a bias in favor of admitting male students. See P. Bickel, et al., "Sex Bias in Graduate Admissions: Data from Berkeley," *Science*, vol. 187, issue 4175, at pp. 398-404 (1975), which is hereby incorporated by reference.

Figure 1:
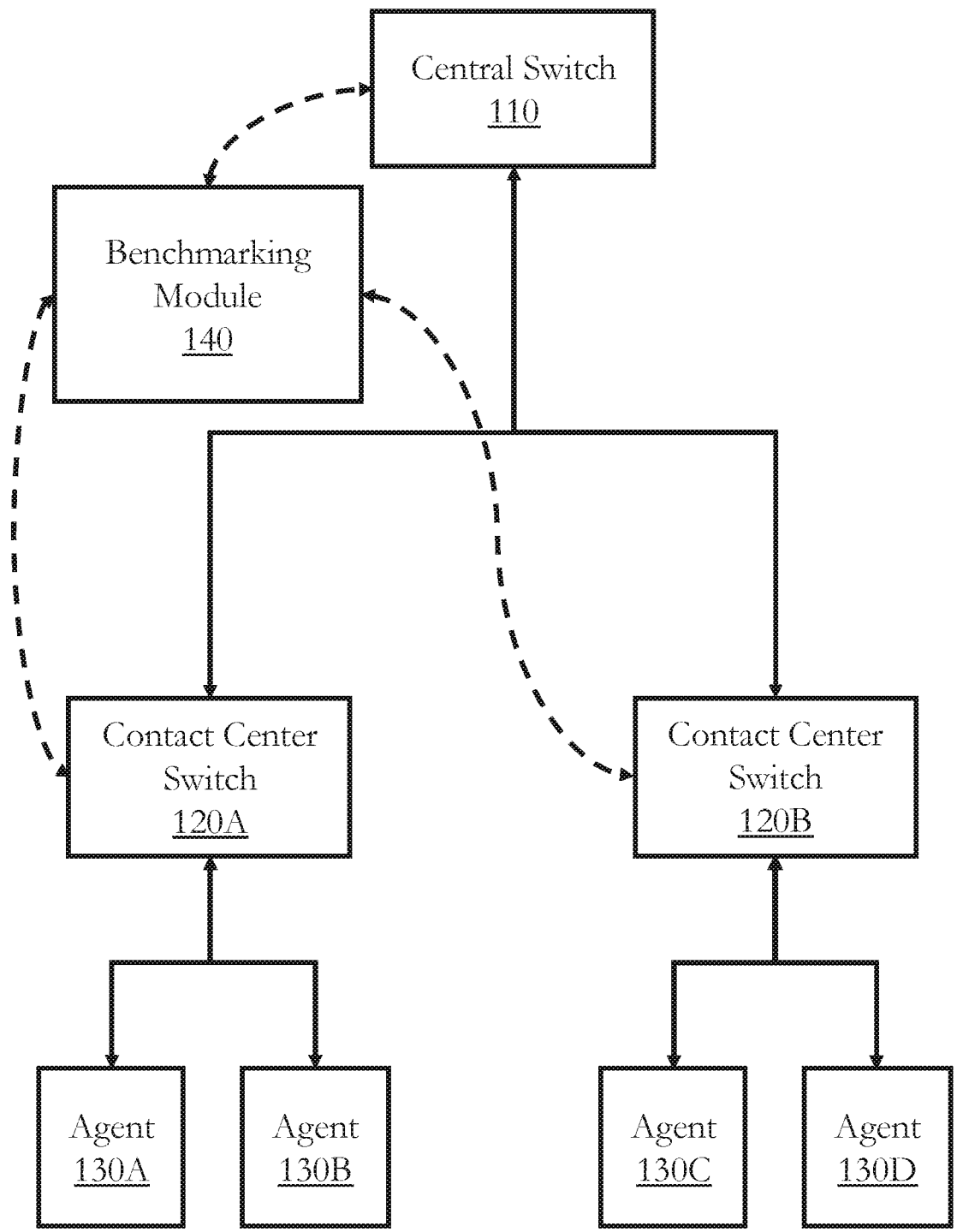
FIG. 1 shows a block diagram of a contact center system according to embodiments of the present disclosure.

FIG. 1 shows a block diagram of a contact center system 100 according to embodiments of the present disclosure. The description herein describes network elements, computers, and/or components of a system and method for simulating contact center systems that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

As shown in FIG. 1, the contact center system 100 may include a central switch 110. The central switch 110 may receive incoming contacts (e.g., callers) or support outbound connections to contacts via a telecommunications network (not shown). The central switch 110 may include contact routing hardware and software for helping to route contacts among one or more contact centers, or to one or more PBX/ACDs or other queuing or switching components within a contact center.

The central switch 110 may not be necessary if there is only one contact center, or if there is only one PBX/ACD routing component, in the contact center system 100. If more than one contact center is part of the contact center system 100, each contact center may include at least one contact center switch (e.g., contact center switches 120A and 120B). The contact center switches 120A and 120B may be communicatively coupled to the central switch 110.

Each contact center switch for each contact center may be communicatively coupled to a plurality (or "pool") of agents. Each contact center switch may support a certain number of agents (or "seats") to be logged in at one time. At any given time, a logged-in agent may be available and waiting to be connected to a contact, or the logged-in agent may be unavailable for any of a number of reasons, such as being connected to another contact, performing certain post-call functions such as logging information about the call, or taking a break.

In the example of FIG. 1, the central switch 110 routes contacts to one of two contact centers via contact center switch 120A and contact center switch 120B, respectively. Each of the contact center switches 120A and 120B are shown with two agents each. Agents 130A and 130B may be logged into contact center switch 120A, and agents 130C and 130D may be logged into contact center switch 120B. In a multi-skilled environment, contacts may be directed to one contact center switch or another, one pool of agents or another, etc., depending on the needs of the contact. For example, agents skilled at sales may be more likely to receive contacts seeking to make a purchase, whereas agents skilled at technical support may be more likely to receive contacts seeking technical assistance.

The contact center system 100 may also be communicatively coupled to an integrated service from, for example, a third party vendor. In the example of FIG. 1, benchmarking module 140 may be communicatively coupled to one or more switches in the switch system of the contact center system 100, such as central switch 110, contact center switch 120A, or contact center switch 120B. In some embodiments, switches of the contact center system 100 may be communicatively coupled to multiple benchmarking modules. In some embodiments, benchmarking module 140 may be embedded within a component of a contact center system (e.g., embedded in or otherwise integrated with a switch).

The benchmarking module 140 may receive information from a switch (e.g., contact center switch 120A) about agents logged into the switch (e.g., agents 130A and 130B) and about incoming contacts via another switch (e.g., central switch 110) or, in some embodiments, from a network (e.g., the Internet or a telecommunications network) (not shown). In some embodiments, benchmarking module 140 may be configured to measure relative performance among two or more pairing strategies with Yule-Simpson effect compensation, without Yule-Simpson effect compensation, or both.

Figure 2:
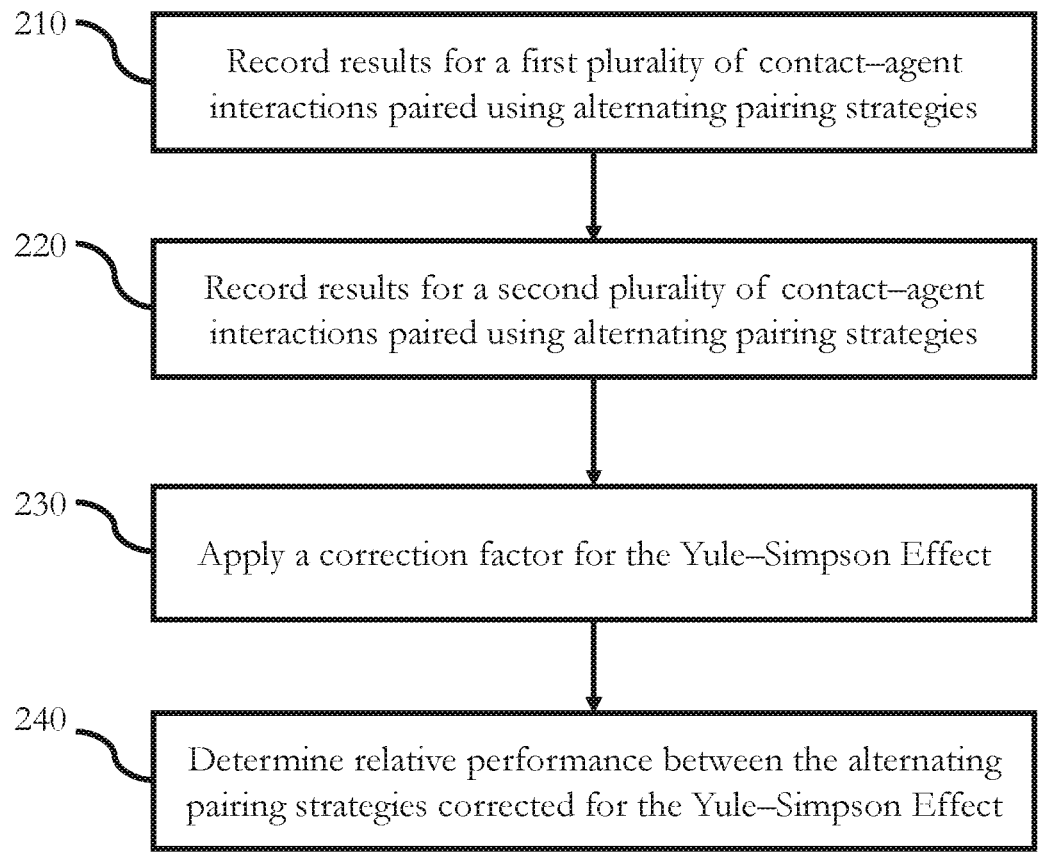
FIG. 2 shows a flow diagram of a benchmarking method according to embodiments of the present disclosure.

FIG. 2 shows a flow diagram of benchmarking method 200 according to embodiments of the present disclosure. At block 210, benchmarking method 200 may begin.

At block 210, results for a first plurality of contact-agent interactions paired using alternating pairing strategies may be recorded. For example, benchmarking module 140 (FIG. 1) or other pairing modules (not shown) may cycle among two or more pairing strategies, such as a first-in, first-out ("FIFO") pairing strategy and a behavioral pairing ("BP") pairing strategy. Various other pairing strategies (e.g., longest-available agent pairing strategy, fewest-contact-interactions-taken-by-agent pairing strategy, etc.), and various benchmarking strategies (e.g., epoch, inline, and hybrid epoch-inline benchmarking strategies) are described in, e.g., U.S. patent application Ser. No. 15/131,915, filed Apr. 18, 2016, which is hereby incorporated by reference. In some embodiments, the contact center system (e.g., contact center system 100) may be an inbound call center, and each contact-agent interaction is a call answered and handled by a phone agent. In other embodiments, contact-agent interactions may occur via email, instant messaging or chat, offline case allocations, etc.

At block 220, results for a second plurality of contact-agent interactions paired using the alternating pairing strategies (e.g., FIFO and BP pairing strategies) may be recorded. In some embodiments, blocks 210 and 220 may be performed simultaneously, as results for individual contact-agent interactions associated with either the first or second plurality of contact-agent interactions become available for recording or other processing. In some embodiments, contact-agent interactions may be grouped into more than two pluralities.

In some embodiments, contact-agent interactions may be divided based on sites. For example, the first plurality of contact-agent interactions may be handled by one contact center system, and the second plurality of contact-agent interactions may be handled by a second contact center system. Unequal distributions of contacts coupled with differences in measured outcomes between the two or more different sites (e.g., contact center systems) may give rise to the Yule-Simpson effect on the relative performance between the alternating pairing strategies.

In some embodiments, contact-agent interactions may be divided based on switches. For example, the first plurality of contact-agent interactions may be handled by one contact center switch (e.g., contact center switch 120A in FIG. 1), and the second plurality of contact-agent interactions may be handled by a second contact center switch (e.g., contact center switch 120B in FIG. 1). Unequal distributions of contacts coupled with differences in measured outcomes between the two or more switches may give rise to the Yule-Simpson effect on the relative performance between the alternating pairing strategies.

In some embodiments, contact-agent interactions may be divided based on skills. For example, the first plurality of contact-agent interactions may be handled by one pool of agents specializing in, e.g., sales, and the second plurality of contact-agent interactions may be handled by a second pool of agents specializing in, e.g., technical support. Unequal distributions of contacts coupled with differences in measured outcomes between the two or more skills may give rise to the Yule-Simpson effect on the relative performance between the alternating pairing strategies.

In some embodiments, contact-agent interactions may be divided based on time periods. For example, the first plurality of contact-agent interactions may be those that occurred during a first time period (e.g., a first hour, day, week, month), and the second plurality of contact-agent interactions may be those that occurred during a second time period (e.g., a second hour, day, week, month). Unequal distributions of contacts coupled with differences in measured outcomes between the two or more time periods may give rise to the Yule-Simpson effect on the relative performance between the alternating pairing strategies.

In some embodiments, contact-agent interactions may be divided based on benchmarking schedules. For example, the first plurality of contact-agent interactions may be handled according to a first benchmarking schedule (e.g., 50% FIFO and 50% BP). At some point, such as a point in time during a benchmarking reporting cycle (e.g., one week, one month), the benchmarking schedule may be adjusted, and the second plurality of contact-agent interactions may be handled according to a second benchmarking schedule (e.g., 20% FIFO and 80% BP). Unequal distributions of contacts coupled with differences in measured outcomes such as changes in conversion rates between the two or more benchmarking schedules may give rise to the Yule-Simpson effect on the relative performance between the alternating pairing strategies.

In some embodiments, the benchmarking schedule (e.g., 50% FIFO and 50% BP) may span a short period of time (e.g., thirty minutes, one hour) to complete one full cycle switching strategies. In other embodiments, the benchmarking schedule may span a longer period of time (e.g., several hours, two days). For longer cycle durations (e.g., two days, or one day of FIFO followed by one day of BP), there is a greater likelihood of an unequal distribution of contacts coupled with differences in measured outcomes, which may be due to special day-to-day promotional activities (e.g., Black Friday, Cyber Monday, holiday sales) or other sources of noise or variability.

In some embodiments, unequal distributions of contacts between the two or more portions of a benchmarking schedule may give rise to the Yule-Simpson effect as well. For example, a benchmarking schedule other than 50/50 (e.g., 20% FIFO and 80% BP) may be expected to have unequal distributions of contacts coupled with differences in measured outcomes between the different pairing strategies.

Moreover, even for 50/50 benchmarking schedules, unequal distributions of contacts may arise due to fluctuations in contact volume during the reporting cycle. For example, in the case of a 50/50 benchmarking schedule, one skill group may end up pairing 45% of contacts during the FIFO portion and 55% during the BP portion, while another skill group may remain at 50% each.

In some embodiments, different skills may be operating using different benchmarking schedules, or they may be operating on the same benchmarking schedule, but the benchmark distribution may be disturbed due to volume fluctuations for one or more the previously described reasons. For example, one skill may be a phone-based sales queue operating on a 50/50 benchmark, and the other skill may be a web-based sales queue operating on an 80/20 benchmark. In these embodiments, an unequal distribution of contacts coupled with differences in measured outcomes may give rise to the Yule-Simpson effect due to the differences in benchmarking schedules across skills.

In some embodiments, scheduled maintenance, contact center downtime, connectivity issues, or other unplanned slow-downs or outages may lead to unequal distributions of contacts coupled with differences in measured outcomes that gives rise to the Yule-Simpson effect.

The embodiments and scenarios described above are merely examples; many other situations may arise within a contact center system that can lead to imbalances to an underlying benchmarking strategy and the outcomes of different sets of contact interactions (e.g., call outcomes), which may give rise to the Yule-Simpson effect.

In some embodiments, contact-agent interactions may be divided based on a combination of two or more criteria for dividing contact-agent interactions. For example, contact-agent interactions may be divided by switch by site, by skill by day, by skill by benchmarking schedule, by skill by switch by day, etc.

Having recorded results for the two (or more) pluralities of contact-agent interactions at blocks 210 and 220, benchmarking method 200 may proceed to block 230.

At block 230, a correction factor may be applied to correct for the Yule-Simpson effect, and at block 240, relative performance between the alternating pairing strategies, corrected for the Yule-Simpson effect, may be determined.

The following tables illustrate an example of the Yule-Simpson effect on a contact center system in which benchmarking method 200 may be performed as described above. In this simple, illustrative scenario, the benchmarking module is operating on a sales queue in a contact center system with two skills, Skill A and Skill B (e.g., sales to new customers and sales to upgrade existing customers). Contacts may be paired to agents of either Skill A or Skill B, alternating between BP and FIFO pairing strategies. For each contact-agent interaction, a result is recorded. In this example, the result is binary indication of whether a sale was successfully completed with a new customer in Skill A or an existing customer in Skill B. The first plurality of contact-agent interactions are those assigned to agents designated for Skill A, and the second plurality of contact-agent interactions are those assigned to agents designated for Skill B.

TABLE I

|  | BP Sales | FIFO Sales |
| --- | --- | --- |
| Skill A | 20 of 200 | 2 of 50 |
| Skill B | 30 of 100 | 28 of 100 |
| Total | 50 of 300 | 30 of 150 |

As shown in Table I (above), the contact center system handled 450 contact-agent interactions (e.g., 450 calls). The first plurality of contact-agent interactions (designated for Skill A) contained a total of 250 interactions, of which 200 were paired using BP and 50 were paired using FIFO. The second plurality of contact-agent interactions (designated for Skill B) contained a total of 200 interactions, of which 100 were paired using BP and 100 were paired using FIFO.

Also, as shown in Table I, results were recorded for each contact-agent interaction. There were 22 successful sales within the first plurality of 250 Skill A interactions, of which 20 were attributable to BP pairing and 2 were attributable to FIFO pairing. There were 58 successful sales within the second plurality of 200 Skill B interactions, of which 30 were attributable to BP pairing and 28 were attributable to FIFO pairing. In this example, unequal contact distribution between skills gives rise to the Yule-Simpson effect, as shown in Table II (below).

TABLE II

|  | BP Conversion Rate | FIFO Conversion Rate | Relative Performance of BP over FIFO |
| --- | --- | --- | --- |
| Skill A | 10.0% | 4.0% | 150.0% |
| Skill B | 30.0% | 28.0% | 7.1% |
| Total | 16.7% | 20.0% | −16.7% |

As show in Table II, conversion rates can be determined that are attributable to each of the pairing strategies. The conversion rate for all interactions paired using BP (50 of 300) is approximately 16.7%, and the conversion rate for all interactions paired using FIFO (30 of 150) is 20%. In this example, it appears as though BP performed worse than FIFO across all interactions. The drop in performance from FIFO to BP is approximately a negative 16.7% gain.

Also, as shown in Table II, the conversion rates for interactions of the first plurality (Skill A) is 10% for BP pairings (20 of 200) and 4% for FIFO pairings (2 of 50). The conversion rates for interactions of the second plurality (Skill B) is 30% for BP pairings (30 of 100) and 28% for FIFO pairings. In this example, BP performed better than FIFO across all of the Skill A interactions (150% gain) and all of the Skill B interactions (approximately 7.1% gain). Paradoxically, BP performed better than FIFO when calculated on a skill-by-skill basis, but worse when the unequal distributions of interactions are inappropriately summed without a correction factor for the Yule-Simpson effect ("Simpson's Paradox").

In some embodiments, one or more correction factors may be applied to correct for the Yule-Simpson effect to, for example, normalize the uneven distribution of interactions across skills. In some embodiments, correction factors may be applied to the first plurality of contact-agent interactions (Skill A) to normalize the number of contact-agent interactions paired within Skill A using BP and FIFO, and correction factors may be applied to the second plurality of contact-agent interactions (Skill B) to normalize the number of contact-agent interactions paired within Skill B using BP and FIFO, as shown below in Table III.

In some embodiments, the correction factor for each combination of pairing method and skill may be one-half the ratio of total contact-agent interactions for the skill to the number of contact-agent interactions for the pairing method within the skill, as shown below in Table III. For example, the BP correction factor for Skill A may be computed as (0.5)(200+50)/200=0.625, and the FIFO correction factor for Skill A may be computed as (0.5)(200+50)/50=2.5. Because the number of contact-agent interactions is already balanced between BP and FIFO pairings within Skill B, no correction factors are needed (i.e., a multiplicative identity factor of 1.0).

Applying the BP and FIFO correction factors to the BP Sales and FIFO Sales, respectively, results in normalized values for BP Sales and FIFO sales, as shown in Table III.

TABLE III

|  | BP Correction Factor | FIFO Correction Factor | BP Sales (Normalized) | FIFO Sales (Normalized) |
|---|---|---|---|---|
| Skill A | 0.625 | 2.5 | 12.5 of 125 | 5 of 125 |
| Skill B | N/A (1.0) | N/A (1.0) | 30 of 100 | 28 of 100 |
| Total |  |  | 42.5 of 225 | 33 of 225 |

Other embodiments may use other suitable corrections, adjustments, or other techniques to normalize or otherwise compensate for the Yule-Simpson effect. In each case, the conversion rates for each individual skill remains the same, so the relative performance of BP over FIFO for each individual skill remains the same. However, having normalized the number of interactions across each skill, the data may now be aggregated appropriately to arrive at a total conversion rate across all skills, and a total gain in performance of BP over FIFO.

The example shown in Table IV shows conversion rates and relative performance for the two pairing strategies across skills and in the aggregate after applying one or more correction factors as shown in, e.g., Tables IIIA-C. Table IV shows that Simpson's Paradox has been eliminated, and an appropriate total positive gain for BP over FIFO has been determined.

TABLE IV

|  | BP Conversion Rate | FIFO Conversion Rate | Relative Performance of BP over FIFO |
|---|---|---|---|
| Skill A | 10.0% | 4.0% | 150.0% |
| Skill B | 30.0% | 28.0% | 7.1% |
| Total (Normalized) | 18.9% | 14.7% | 28.6% |

As shown in Table IV, the conversion rates for BP and FIFO pairings within each skill remain the same. Accordingly, the relative performance or gain of BP over FIFO remains the same for each skill (i.e., 150% and approximately 7.1%, respectively). However, in contrast to the total or aggregated gain shown in Table II (approximately −16.7%), the normalized total or aggregated gain shown in Table IV is 28.6%. In Table IV, the effect of Simpson's Paradox has been eliminated, and the aggregated gain is appropriately positive just as the gain for the individual skills is positive.

Following the determination of the relative performance corrected for the Yule-Simpson effect at block 240, benchmarking method 200 may end. In some embodiments, benchmarking method 200 may return block 210 and/or block 220 to record and process further results of contact-agent interactions.

In some embodiments, the increase in performance of one pairing strategy (e.g., BP) over another (e.g., FIFO) may be used to determine an economic benefit. In turn, this economic benefit may be used to determine a fee or payment to a third-party vendor or other supplier of the beneficial pairing strategy (e.g., a vendor of a behavioral pairing module). Thus, correcting for the Yule-Simpson effect, the vendor's customers can be assured that they are charged a fair price, and the Yule-Simpson effect does not inadvertently lead to charging too much or too little by aggregating data in a statistically inappropriate way.

Figure 3:
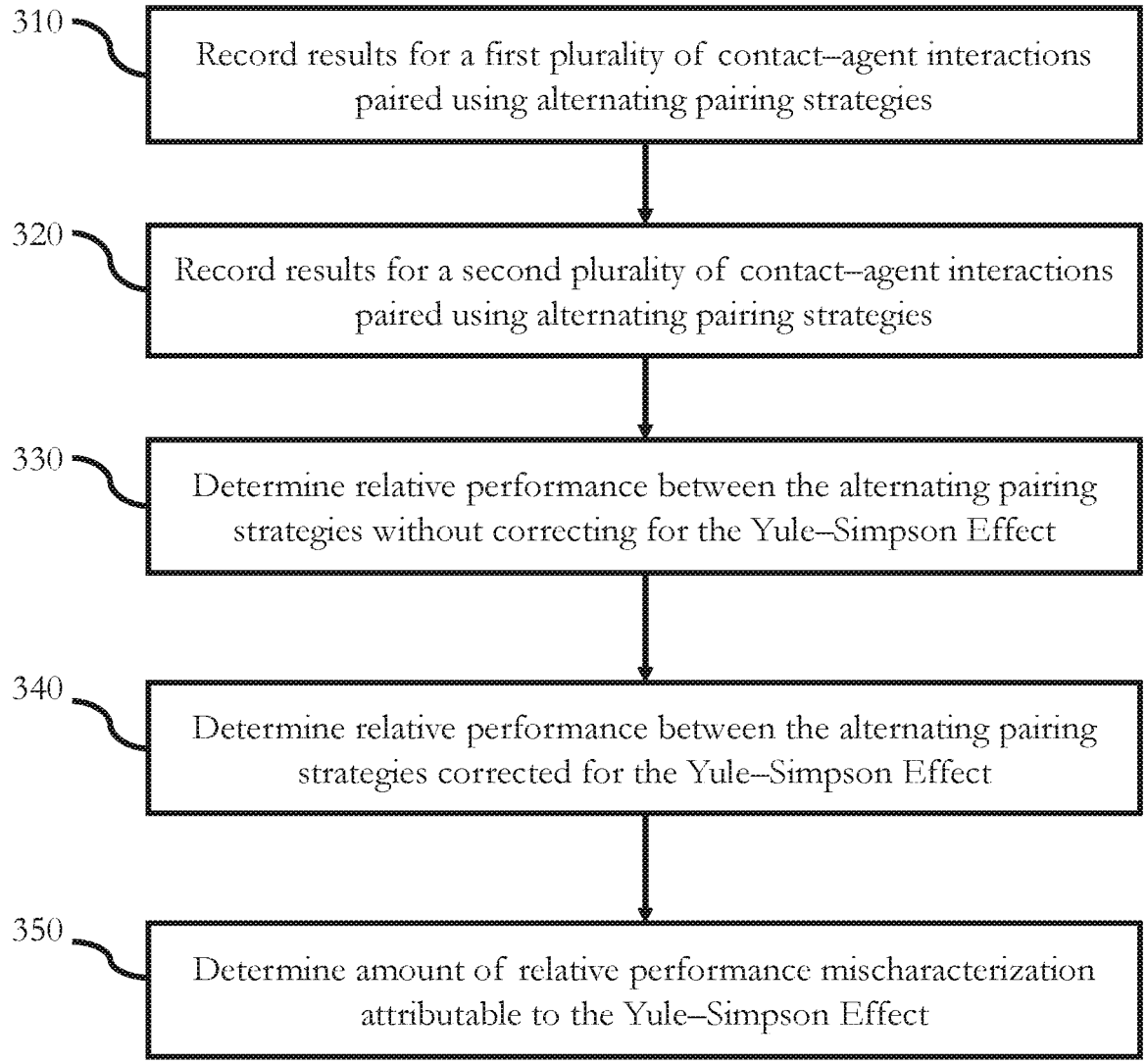
FIG. 3 shows a flow diagram of a benchmarking method according to embodiments of the present disclosure.

In some embodiments, the benchmarking module 140 may be configured to determine an aggregated performance gain that does not correct for the Yule-Simpson effect in addition to a normalized aggregated performance gain that does correct for the Yule-Simpson effect. For example, FIG. 3 shows a flow diagram of benchmarking method 300 according to embodiments of the present disclosure. At block 310, benchmarking method 300 may begin.

At block 310, as in block 210 of benchmarking method 200, results for a first plurality of contact-agent interactions paired using alternating pairing strategies may be recorded. At block 320, as in block 220 of benchmarking method 200, results for a second plurality of contact-agent interactions paired using the alternating pairing strategies may be recorded. In some embodiments, blocks 310 and 320 may be performed simultaneously, as results for individual contact-agent interactions associated with either the first or second plurality of contact-agent interactions become available for recording or other processing. In some embodiments, contact-agent interactions may be grouped into more than two pluralities.

At block 330, relative performance between the alternating pairing strategies may be determined without correcting for the Yule-Simpson effect. For example, as in Table II above, the total relative performance of BP to FIFO was a loss of approximately 16.7%.

At block 340, relative performance between the alternating pairing strategies may be determined with correction for the Yule-Simpson effect. For example, as in Table IV above, the normalized total relative performance of BP to FIFO was a gain of 28.6%.

At block 350, in some embodiments, an amount of relative performance mischaracterization attributable to the Yule-Simpson effect may be determined. For example, comparing the total gain in Table II to the normalized total gain in Table IV, the Yule-Simpson effect caused an approximately 45.3-point drop in relative performance of BP to FIFO, or a decrease of approximately 171.3%. In some embodiments, the output of blocks 330, 340, and/or 350, along with other information regarding the performance of the contact center system, may be incorporated into reports or stored in databases or other memory. This information may be helpful for demonstrating the impact of the Yule-Simpson effect and the importance of correcting it and accounting for it to determine the statistically appropriate economic value attributable to one pairing strategy over another.

Following the output of gains or other data generated at blocks 330, 340, and/or 350, benchmarking method 300 may end. In some embodiments, benchmarking method 300 may return block 310 and/or block 320 to record and process further results of contact-agent interactions.

At this point it should be noted that benchmarking pairing strategies in a contact center system in accordance with the present disclosure as described above may involve the processing of input data and the generation of output data to some extent. This input data processing and output data generation may be implemented in hardware or software. For example, specific electronic components may be employed in a behavioral pairing module or similar or related circuitry for implementing the functions associated with behavioral pairing in a contact center system in accordance with the present disclosure as described above. Alternatively, one or more processors operating in accordance with instructions may implement the functions associated with behavioral pairing in a contact center system in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer processor-implemented method for benchmarking pairing strategies in a contact center system comprising:
    determining, by at least one computer processor communicatively coupled to and configured to operate in the contact center system, a first set of contact-agent interaction results for a first cross-section of interactions paired using a first pairing strategy;
    determining, by the at least one computer processor, a second set of contact-agent interaction results for the first cross-section of interactions paired using a second pairing strategy;
    determining, by the at least one computer processor, a third set of contact-agent interaction results for a second cross-section of interactions paired using the first pairing strategy;
    determining, by the at least one computer processor, a fourth set of contact-agent interaction results for the second cross-section of interactions paired using the second pairing strategy;
    normalizing, by the at least one computer processor, the first set with the second set and the third set with the fourth set;
    determining, by the at least one computer processor, a first comparison comprising a first combination of the first and third normalized sets with a second combination of the second and fourth normalized sets; and
    outputting, by the at least one computer processor, the first comparison, wherein the first comparison demonstrates that the first pairing strategy improves performance of the contact center system over the second pairing strategy.

2. The method of claim 1, wherein the first pairing strategy is a behavioral pairing strategy.

3. The method of claim 1, wherein the normalizing is a correction for a Yule-Simpson effect.

4. The method of claim 1, wherein the first cross-section of interactions and the second cross-section of interactions are based on at least one of:
    a plurality of time periods,
    a plurality of agent skills,
    a plurality of contact-agent assignment strategies (pairing strategies),
    a plurality of contact center system sites,
    a plurality of contact center system switches, and
    a plurality of benchmarking schedules.

5. The method of claim 1, further comprising:
    determining, by the at least one computer processor, a second comparison comprising a third combination of the first and third sets with a fourth combination of the second and fourth sets; and
    outputting, by the at least one computer processor, a third comparison of the first comparison with the second comparison, wherein the third comparison demonstrates an extent of a Yule-Simpson effect.

6. The method of claim 1, wherein the normalizing comprises equalizing unequal distributions of contact-agent interactions in the first cross-section of interactions and equalizing unequal distributions of contact-agent interactions in the second cross-section of interactions.

7. The method of claim 1, wherein the first combination of the first and third normalized sets comprises aggregated normalized results of the first and third normalized sets.

8. A system for benchmarking pairing strategies in a contact center system comprising:
    at least one computer processor communicatively coupled to and configured to operate in the contact center system, wherein the at least one computer processor is further configured to:
    determine a first set of contact-agent interaction results for a first cross-section of interactions paired using a first pairing strategy;
    determine a second set of contact-agent interaction results for the first cross-section of interactions paired using a second pairing strategy;
    determine a third set of contact-agent interaction results for a second cross-section of interactions paired using the first pairing strategy;
    determine a fourth set of contact-agent interaction results for the second cross-section of interactions paired using the second pairing strategy;
    normalize the first set with the second set and the third set with the fourth set;
    determine a first comparison comprising a first combination of the first and third normalized sets with a second combination of the second and fourth normalized sets; and
    output the first comparison, wherein the first comparison demonstrates that the first pairing strategy improves performance of the contact center system over the second pairing strategy.

9. The system of claim 8, wherein the first pairing strategy is a behavioral pairing strategy.

10. The system of claim 8, wherein the normalizing is a correction for a Yule-Simpson effect.

11. The system of claim 8, wherein the first cross-section of interactions and the second cross-section of interactions are based on at least one of:
    a plurality of time periods,
    a plurality of agent skills,
    a plurality of contact-agent assignment strategies (pairing strategies),
    a plurality of contact center system sites,
    a plurality of contact center system switches, and
    a plurality of benchmarking schedules.

12. The system of claim 8, wherein the at least one computer processor is further configured to:
    determine a second comparison comprising a third combination of the first and third sets with a fourth combination of the second and fourth sets; and
    output a third comparison of the first comparison with the second comparison, wherein the third comparison demonstrates an extent of a Yule-Simpson effect.

13. The system of claim 8, wherein the normalizing comprises equalizing unequal distributions of contact-agent interactions in the first cross-section of interactions and equalizing unequal distributions of contact-agent interactions in the second cross-section of interactions.

14. The system of claim 8, wherein the first combination of the first and third normalized sets comprises aggregated normalized results of the first and third normalized sets.

15. An article of manufacture for benchmarking pairing strategies in a contact center system comprising:
a non-transitory processor readable medium; and
instructions stored on the medium;
wherein the instructions are configured to be readable from the medium by at least one computer processor communicatively coupled to and configured to operate in the contact center system and thereby cause the at least one computer processor to operate so as to:
determine a first set of contact-agent interaction results for a first cross-section of interactions paired using a first pairing strategy;
determine a second set of contact-agent interaction results for the first cross-section of interactions paired using a second pairing strategy;
determine a third set of contact-agent interaction results for a second cross-section of interactions paired using the first pairing strategy;
determine a fourth set of contact-agent interaction results for the second cross-section of interactions paired using the second pairing strategy;
normalize the first set with the second set and the third set with the fourth set;
determine a first comparison comprising a first combination of the first and third normalized sets with a second combination of the second and fourth normalized sets; and
output the first comparison, wherein the first comparison demonstrates that the first pairing strategy improves performance of the contact center system over the second pairing strategy.

16. The article of manufacture of claim 15, wherein the first pairing strategy is a behavioral pairing strategy.

17. The article of manufacture of claim 15, wherein the normalizing is a correction for a Yule-Simpson effect.

18. The article of manufacture of claim 15, wherein the first cross-section of interactions and the second cross-section of interactions are based on at least one of:
a plurality of time periods,
a plurality of agent skills,
a plurality of contact-agent assignment strategies (pairing strategies),
a plurality of contact center system sites,
a plurality of contact center system switches, and
a plurality of benchmarking schedules.

19. The article of manufacture of claim 15, wherein the at least one computer processor is further caused to operate so as to:
determine a second comparison comprising a third combination of the first and third sets with a fourth combination of the second and fourth sets; and
output a third comparison of the first comparison with the second comparison, wherein the third comparison demonstrates an extent of a Yule-Simpson effect.

20. The article of manufacture of claim 15, wherein the normalizing comprises equalizing unequal distributions of contact-agent interactions in the first cross-section of interactions and equalizing unequal distributions of contact-agent interactions in the second cross-section of interactions.

* * * * *